United States Patent
Wang et al.

(10) Patent No.: US 8,090,077 B2
(45) Date of Patent: *Jan. 3, 2012

(54) TESTING ACOUSTIC ECHO CANCELLATION AND INTERFERENCE IN VOIP TELEPHONES

(75) Inventors: Kuansan Wang, Bellevue, WA (US); Nirav Girish Shah, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1310 days.

This patent is subject to a terminal disclaimer.

(21) Appl. No.: 11/731,956

(22) Filed: Apr. 2, 2007

(65) Prior Publication Data

US 2008/0240370 A1    Oct. 2, 2008

(51) Int. Cl.
*H04M 1/24* (2006.01)
*H04M 3/08* (2006.01)
*H04M 3/22* (2006.01)

(52) U.S. Cl. .................. 379/3; 379/406.05; 370/286

(58) Field of Classification Search .......... 379/1.01, 379/3, 406.01, 406.05; 370/352, 286, 289; 381/58, 71.1, 71.6, 94.1, 95, 96; 704/200, 704/211, 220

See application file for complete search history.

(56) References Cited

U.S. PATENT DOCUMENTS

| | | |
|---|---|---|
| 5,566,272 A | 10/1996 | Brems et al. |
| 5,640,490 A | 6/1997 | Hansen et al. |
| 6,202,047 B1 | 3/2001 | Ephraim et al. |
| 6,324,170 B1 * | 11/2001 | McClennon et al. ......... 370/286 |
| 7,003,458 B2 | 2/2006 | Feng et al. |
| 7,026,957 B2 | 4/2006 | Rubenstein |
| 7,085,374 B2 | 8/2006 | Schulz |
| 7,130,281 B1 | 10/2006 | Surazski et al. |
| 2002/0075818 A1 | 6/2002 | Matsuo |
| 2005/0015253 A1* | 1/2005 | Rambo et al. ................. 704/246 |
| 2006/0031469 A1 | 2/2006 | Clarke et al. |
| 2006/0104218 A1* | 5/2006 | Kako ............................ 370/252 |
| 2008/0177534 A1* | 7/2008 | Wang et al. ................... 704/211 |

FOREIGN PATENT DOCUMENTS

WO    WO2005099231 A1    10/2005

* cited by examiner

*Primary Examiner* — Quoc D Tran
(74) *Attorney, Agent, or Firm* — Gonzalez, Saggio & Harlan LLP

(57) ABSTRACT

Described is automatically testing the quality of an audio coupling between juxtaposed first and second digital telephones, e.g., VoIP telephones, such as to quantitatively determine the quality of audio echo cancellers in those digital telephones. An analyzer receives timestamps from a first telephone and second telephone during a calling session, including timestamps for when the second telephone initially provides audio (e.g., speech) to the first telephone, when the first telephone initially detects sound, when the first telephone initially provides audio to the second telephone, and when the second telephone initially detects sound. The analyzer uses the relative timing of the timestamps and the speech recognizer's outcome to determine whether the audio coupling is experiencing interference or echo. When the audio includes speech, a confidence level corresponding to accuracy of speech recognition also may establish the audio coupling's quality.

20 Claims, 8 Drawing Sheets

TESTING ACOUSTIC ECHO CANCELLATION AND INTERFERENCE IN VOIP TELEPHONES

BACKGROUND

Some contemporary communication systems use the Internet for transmitting voice calls; the underlying technology is generally referred to as voice over internet protocol, or VoIP. VoIP is rapidly becoming the standard mode of business communication, especially when a business has offices located at distant geographic locations.

VoIP telephones are the endpoints of a VoIP communication channel. VoIP telephones are responsible for converting human speech to IP packets and vice versa. For reliable communication, it is imperative to ensure that the audio streams do not contain jitter, echoes and other undesirable noise disturbances.

Currently, VoIP telephones are tested for their quality with respect to jitter, echoes and other undesirable noise disturbances by having a human tester listen in on VoIP calls. In general, any echo and interference (distortion) are noted by the tester. However, such a testing process is somewhat subjective, is not scalable to testing large numbers of devices, and can be quite expensive.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which quality of an audio coupling between two juxtaposed digital (e.g., VoIP) telephones is evaluated, including by outputting audio generated from audio files by speakers of the second and first telephones, and detected at microphones of the second and first telephones. The relative timing of outputting the audio and detecting sounds at the first telephone and second telephone is analyzed to provide results indicative of the quality of the audio coupling. The telephones may be called by a computing device or via an IP-PBX device, e.g., controlled by a test computing device. Various tests may be performed, including changing which telephone is the first and which telephone is the second with respect to the obtaining the first through fourth timestamps.

In one example implementation, the audio coupling between a first telephone mechanism and a second telephone mechanism is established, such as by calling each telephone. An analyzer receives timestamps from the first telephone mechanism and the second telephone mechanism during a calling session, including a first timestamp corresponding to when the second telephone mechanism initially provides audio to the first telephone mechanism, a second timestamp corresponding to when the first telephone initially detects sound, a third timestamp corresponding to when the first telephone mechanism initially provides audio to the second telephone, and a fourth timestamp corresponding to when the second telephone initially detects sound. The analyzer determines that the telephones are operating correctly with respect to not having interference or echo when the first timestamp is before the second timestamp, the second timestamp is before the third timestamp, and the third timestamp is before the fourth timestamp. Alternatively the analyzer determines that the audio coupling has interference when the fourth timestamp is before the first timestamp or the second timestamp is before the first timestamp, or the audio coupling has echo (e.g., indicative of improper noise cancellation) when the fourth timestamp is before the third timestamp and after the first timestamp.

When the audio includes speech, a speech recognizer recognizes the speech and may determine a confidence level that corresponds to the accuracy of the speech recognition, which also may be used to establish the quality of the audio coupling. Speech recognition may also be used to detect echo, e.g., when the output speech is recognized as matching input speech. One or more audio files may be randomly selected, and/or the time or times corresponding to generating audio from one or more of the audio files may be random, such as to vary the testing.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards using an audio file (e.g., a ".wav" file) or set of audio files to evaluate the quality of VoIP telephones, and/or an IP-PBX device. In general, the audio files correspond to set of spoken words that can be recognized by speech recognition systems. As described below, the first telephones are coupled to computer logic, which ordinarily uses different audio files, each comprising distinct audio such as speech, to facilitate echo detection based part on expected differences in the files, e.g., via speech recognition. However, certain echo detection can also be performed via files that do not necessarily include speech, in which event it is possible to use alternative audio files that comprise tones for testing, possibly including subsonic and/or supersonic frequencies.

In one example implementation, there is described a direct and/or IP-PBX testing configuration in which a call is taking place between a first telephone mechanism on a testing computing device and a second telephone mechanism on the same computing device. These telephone mechanisms include telephones arranged to be physically proximate one another, i.e., juxtaposed, so that the output of one telephone's speaker is picked up by the other's mouthpiece microphone and/or other microphone such as a speakerphone microphone (as well as its own), and vice-versa. As can be readily appreciated, any number of intermediary devices and/or networks may be present between the telephones, including a PBX device, the PSTN, one or more gateways, an intranet, the public Internet, and so forth. However, these intermediaries introduce external variables, and ordinarily are thus avoided to the extent possible, except possibly when it is desired to evaluate a device's operation with one or more specific intermediaries being present, for example. Further, while the first telephone mechanism can be on the same computing device as the second telephone mechanism, separate computer systems for each may also be used, as long as the clocks on the separate computing systems are synchronized.

Thus, as will be understood, the technology described herein is not limited to any type of test configuration, nor to any particular type of particular type (e.g., PBX-type) of telephone systems, but applies to any configuration and/or telephone related-devices that are present in an audio environment. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing, telephony and/or testing in general.

Figure 1:
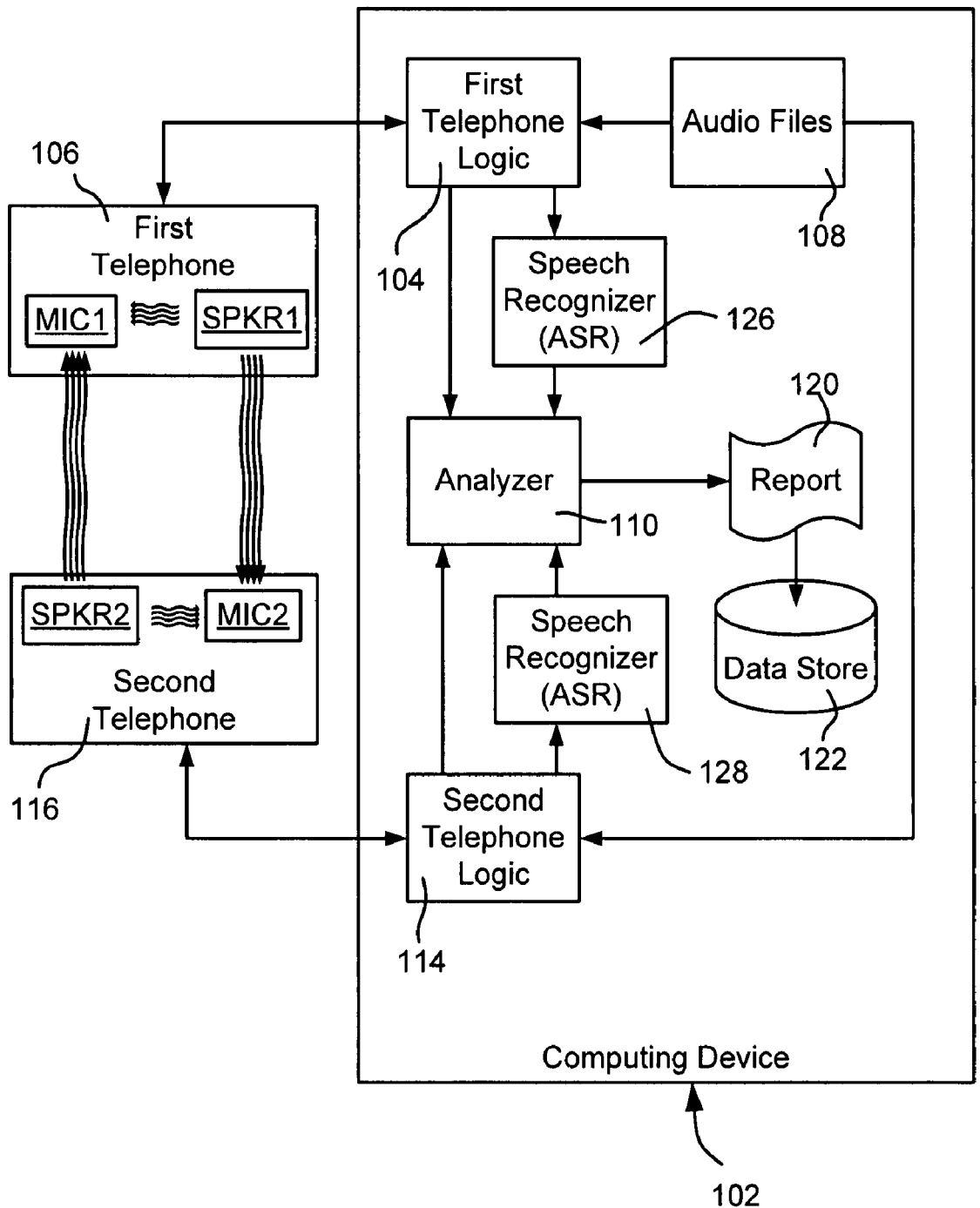
FIG. 1 shows an illustrative example of an automated testing configuration for testing VoIP telephones for quality.
Figure 2:
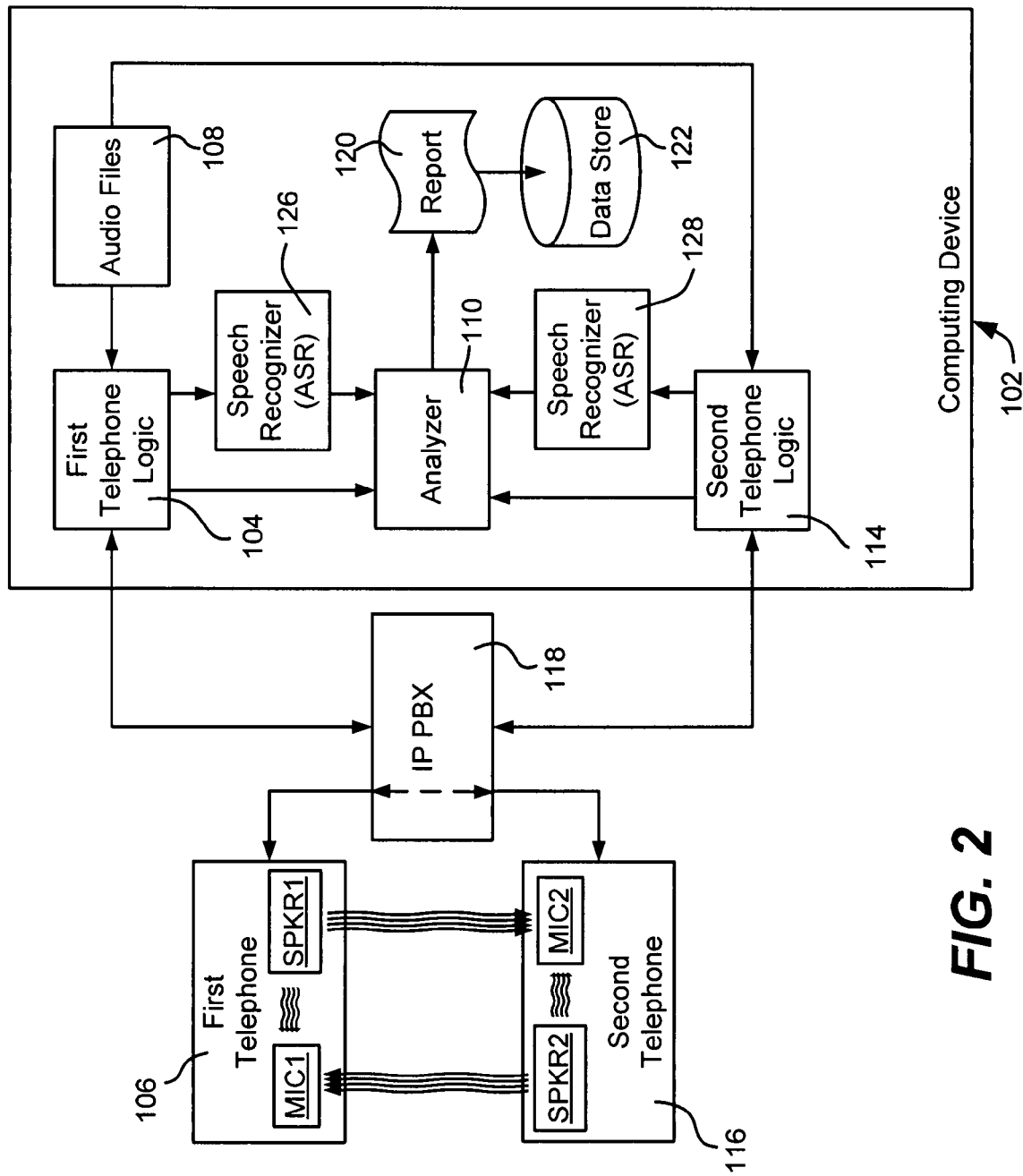
FIG. 2 shows an illustrative example of an automated testing configuration for testing VoIP telephones for quality when connected to one another through an IP-PBX device.

Turning to FIGS. 1 and 2, there is shown a computing device 102 having a first telephone mechanism comprising first telephone logic 104 and a first telephone 106. The first telephone 106 corresponds to a VoIP telephone device being tested, and is controlled by the first telephone logic 106 to output appropriate audio signals such as generated from a selected audio file of a set of audio files 108. As described below, the first telephone logic 106 is also configured to output other data, including timestamp data to an analyzer 110, as described below.

The exemplified computing device 102 also includes a second telephone mechanism comprising second telephone logic 114 and a second telephone 116. The second telephone 116 likewise is tested, and is controlled by the second telephone logic 114 to output appropriate audio signals such as generated from a selected audio file of the set of audio files 108. The second telephone logic 114 also outputs other data including timestamps to the analyzer 110, as also described below.

The first telephone 106 and second telephones may be coupled to the computer system 102 in essentially any way, with any number of intermediary devices, including a device or combination of devices under test. In FIG. 1, the first and second telephones 106 and 116 are each coupled to answer a telephone call made by the first and second telephone logic 104 and 114, respectively. Each telephone includes an automatic answering mechanism such that it will answer the call made by its respective logic. Note that the test configuration of FIG. 1 is arranged such that the telephones 106 and 116 do not go through another intermediary device and/or network, thereby avoiding any testing results that are influenced by external variables.

In FIG. 2, an IP-PBX device 218 (e.g., an actual such device or an emulator of one) couples the first and second telephones 106 and 116 to the computing device 102. Note that in this example, the IP-PBX device 218 is called by the first and second telephone logic 104 and 114, and routes the call to the appropriate telephone 106 and 116, respectively. Note that the IP-PBX device 118 may be one that has been thoroughly tested to know it is not a cause of any reduced quality, thereby ensuring that any quality problems that are detected originate at the IP-Phones being tested. Alternatively, the IP-PBX device 118 may be tested along with the telephones, e.g., to determine whether a particular IP-PBX device 118 has noise or other problems with a particular type or types of VoIP telephones.

As represented in the example testing configurations of FIGS. 1 and 2, the telephones 106 and 116 are juxtaposed so that each one's microphone (MIC1 or MIC2) picks up the audio output of the other's speaker (SPKR2 or SPKR1). Each microphone also picks up its own speaker output, which is needed for testing its corresponding telephone's cancellation of its own output.

To evaluate the quality of the telephones 106 and 116 (FIG. 1), or the telephones 106 and 116 in conjunction with the PBX device 218 (FIG. 2), various data is analyzed by the analyzer 110, including timestamps and speech data. In general, the analyzer generates a test report 120 based on the data, which may be persisted in a data store 122.

For speech recognition purposes, the first telephone logic 104 is associated with one automatic speech recognizer 126, while the second telephone logic 114 is associated with another automatic speech recognizer 128, (although it is feasible to have a single speech recognizer multiplexed between the first telephone and second telephone as needed). The automatic speech recognizers 126 and 128 assume the roles of a human speaker and listener, to device testing, and thereby lower the testing cost for VoIP deployment or the like. However, because automated speech recognition can introduce errors, additional baseline measures are also established and provided.

An aspect of the testing is to quantitatively determine the quality for VoIP telephone calls. More particularly, when VoIP calls are routed through VoIP telephones, these devices often introduce echoes or random noise interference. The testing described herein detects such quality disturbances. For example, by placing numerous calls in succession, the testing configurations can detect acoustic echoes, thereby providing a quantitative estimate of the quality of acoustic echo cancellers in the VoIP telephones.

To this end, the first telephone logic 104 and second telephone logic 114 execute a test scenario and record timestamps for significant events. The analyzer 110 interprets these timestamps and generates a report 120 indicating the occurrence of echoes, noise interferences and the overall quality of the recognized speech.

Figure 3:
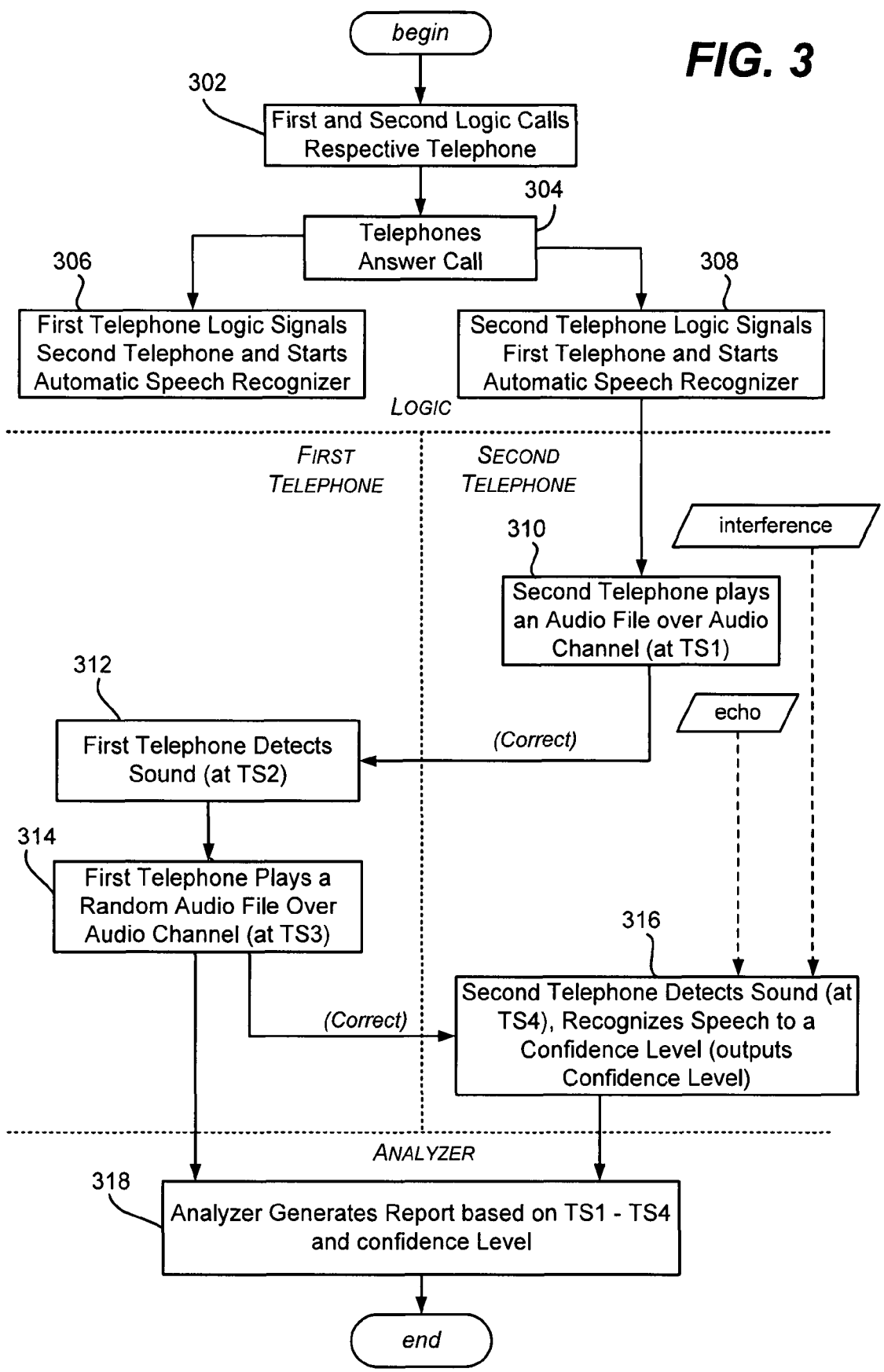
FIG. 3 is a flow diagram representing example steps taken by an analyzer in generating a report corresponding to a device under test.
Figure 4:
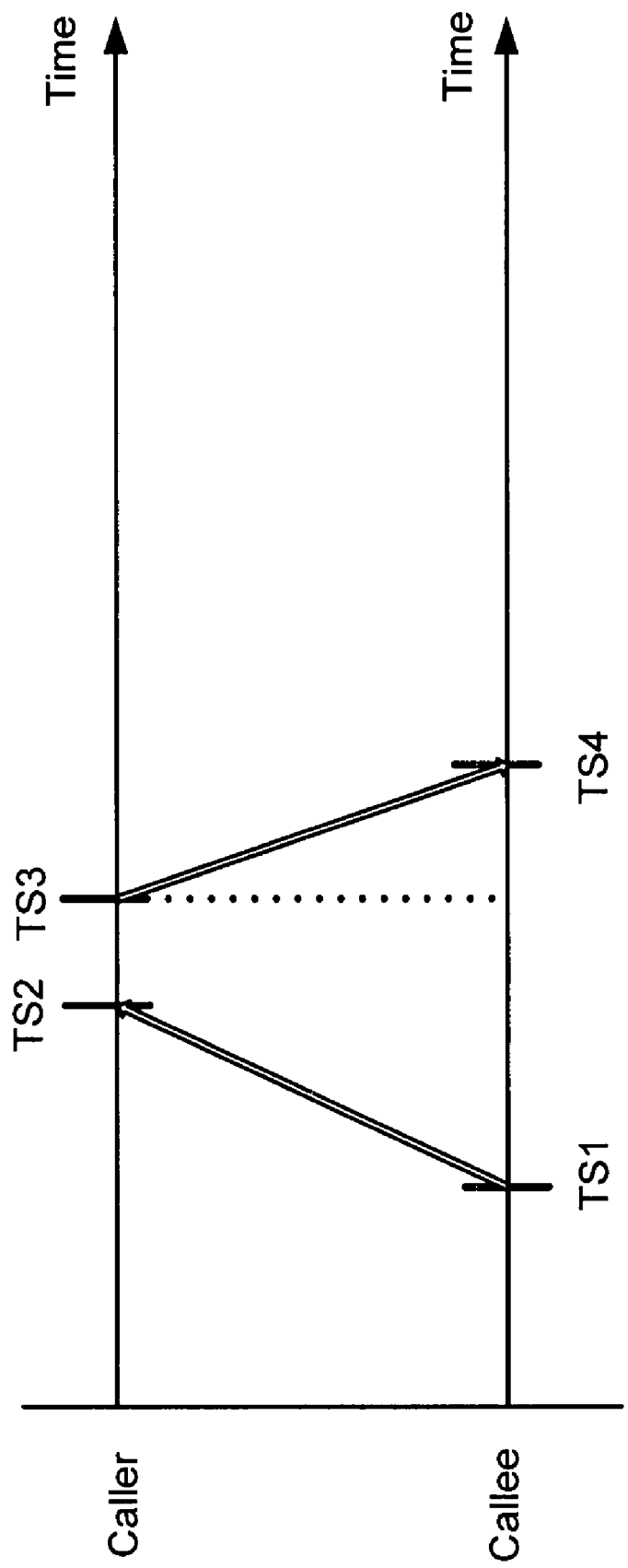
FIG. 4 is a timing diagram representing example time stamps triggered by first telephone and second telephone operations in a correctly executing device (IP-Phone) under test.

By way of example, one suitable test scenario comprises example steps as set forth in the flow diagram of FIG. 3, which performs actions at various times, as represented in the timing diagrams of FIGS. 4-7. As represented by step 302, both the first telephone logic 104 and the second telephone logic 114 call their corresponding physical VoIP telephones 106 and 116, respectively. As described above, these VoIP telephones 106 and 116 have automatic answering capability enabled, have their speakers enabled, and are juxtaposed. Because of the automatic answering, in a typical (non-problematic) situation, the VoIP telephones 106 and 116 answer the incoming call, as represented at step 304.

It should be noted that with respect to some problem, although not explicitly shown in FIGS. 1-3, the exemplified test configurations and process may include a capability to measure the latency of a connection as well, e.g., to detect when the latency is too long to establish a call. For example, a timer is started at the first telephone mechanism at the onset of each test run, and the timer is stopped when the first telephone detects sound (corresponding to a timestamp TS2, described above). If however the timer expires/reaches a defined timeout period, this test session is flagged as having too long a latency to establish a call.

As represented by steps 306 and 308, the first telephone logic 104 and the second telephone logic 114 signal each other that they are connected to their respective VoIP telephones 106 and 116, and start their respective automatic speech recognizers 126 and 128. Note that hereinafter in FIG. 3, the first telephone's actions are generally on the left side, and the second telephone's actions on the right (with the analyzer's step 318 at the bottom), with time progressing from top to bottom.

At step 310 the second telephone logic 114 plays an audio file (e.g., a .wav file) which is output its telephone's speaker SPKR2. This step corresponds to timestamp 1 (TS1) in FIGS. 4-7, which is recorded at the second telephone logic 114 and output (at sometime prior to analysis) to the analyzer 110.

At step 312, via the first telephone's microphone MIC1, the first telephone mechanism's speech recognizer 126 detects the speech (or other audio) from the second telephone's speaker SPKR2. This detection corresponds to time TS2 in FIGS. 4-7 recorded at the first telephone and provided to the analyzer.

Some later time, (at step 314 and at time TS3 in FIGS. 4-7), the first telephone logic 104 then plays a randomly-selected audio file over its telephone's speaker SPKR1, (which needs to be a different audio file from the second telephone's audio file when echo detection based on speech recognition is used, as described below). The use of random selection over a variety of audio files (e.g., with different types of speech such as fast slow, deep voices and high voices) ensures that given enough test repetitions, the device under test will be evaluated over a variety of speech patterns. Note that rather than a random selection, a predefined pattern of audio files may be used, however random provides benefits because the timing of TS3 with respect to TS2 is also variable.

More particularly, TS3 may be a fixed time interval following TS2, but need not always at the same interval, whether a random time interval is used or some preset time variation pattern. Randomness helps ensure that, given enough repetitions, the timing of responding with the audio playback to the second telephone is not a factor in the test results. Random file selection in conjunction with random timing of playing back the file provides the least chance of a coincidence that would factor into the test results.

At step 316, the second telephone 116 detects this speech at its microphone MIC2, which in normal operation (FIG. 4) corresponds to timestamp TS4. Note however that as described below, the second telephone may instead already have generated TS4, because of improper noise cancellation and/or other echo from its own playback (FIG. 5) or interference detected (FIG. 6) at the second telephone.

Step 316 also represents the first telephone's speech being recognized at the second telephone mechanism, and an evaluation made as to the confidence level that the speech was recognized correctly. For example, the first telephone logic 104 can notify the second telephone logic 114 as to what audio file was selected, by which the second telephone logic 114 can access known good recognition text to compare against the actually recognized text. In general, the confidence level is an indication of how accurately the second telephone's speech recognizer 128 was able to recognize the speech.

FIGS. 4-7 are example timing diagrams of possible conditions that provide test results. As set forth above, the timestamps TS1-TS4 comprise parameters that are measured while the test scenario executes, including TS1, the time when second telephone starts playing the second telephone's audio file; TS2, the time when the first telephone mechanism detects speech from that audio file; TS3 the time when the first telephone mechanism starts playing its (e.g., randomly-selected) audio file, and TS4, the time when the second telephone first detects sound (which may be speech). Note that a certain sound level may be tolerated before being considered detected sound, e.g., some threshold may be required to be exceeded by a sound before TS4 is considered as occurring so as to measured. Another parameter set comprises whether the second telephone recognized the speech and a corresponding confidence level.

With the parameters, the analyzer 110 can use the causal ordering of these parameter events and/or the outcome of the speech recognizer to measure the quality of the audio coupling, and hence the device under test. For example, in correct execution represented in FIG. 4, the second telephone 116 picks up speech after the first telephone 106 starts playing the audio file (timestamp TS4 is greater than TS3); also, the second telephone 116 recognizes the audio played by the first telephone 106. This is the expected outcome of the test, and occurs when the second telephone and/or any intermediary (e.g., the PBX device 218) does not introduce echoes or noise interference. When the scenario executes successfully, the confidence level further provides an indication of the speech distortion (if any) introduced in the audio coupling.

Figure 5:
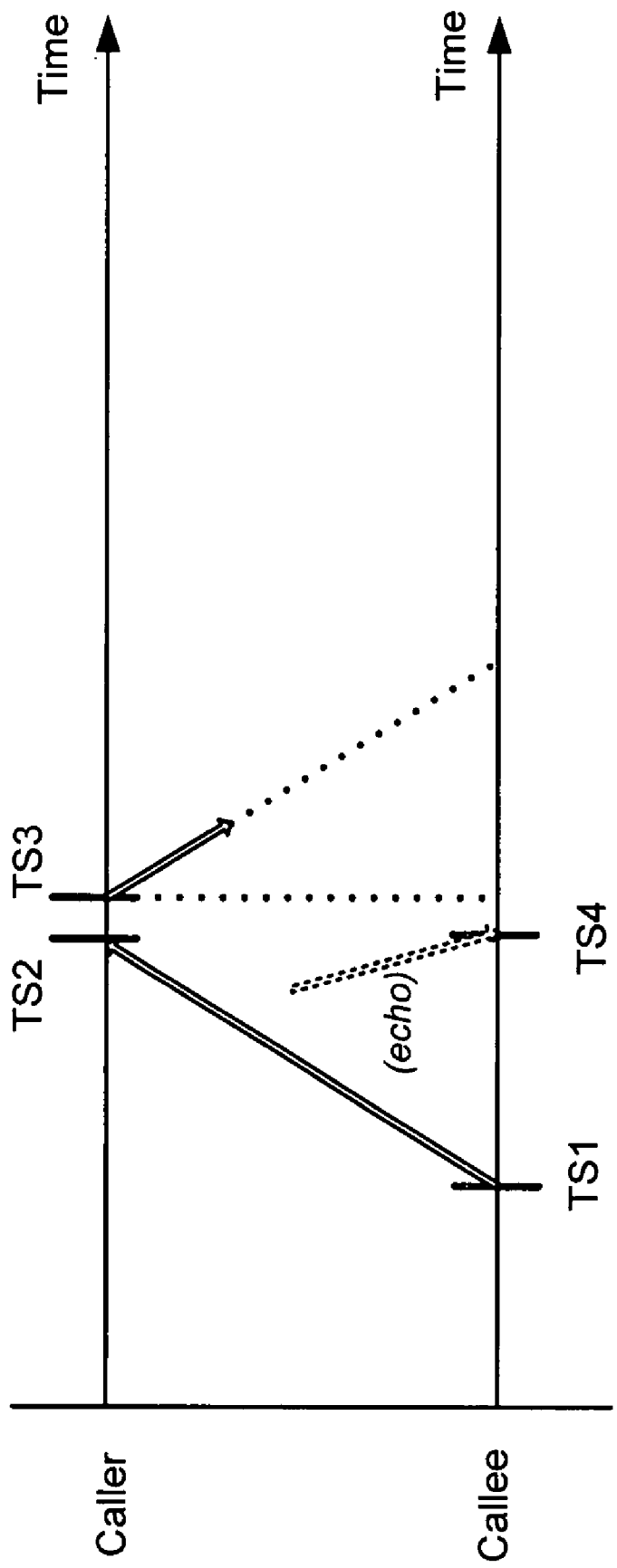
FIG. 5 is a timing diagram representing example time stamps triggered by first telephone and second telephone operations in a device under test that is generating and/or improperly cancelling echo.

FIG. 5 represents echo being detected on the second telephone's side. More particularly, in FIG. 5 the value for timestamp TS4 is less than the value of TS3, but greater than TS1. This implies that the second telephone detects speech even before the first telephone has started to speak at TS3, but some speech has begun at TS1. This typically is due to echo in the audio coupling, primarily from failure to properly noise cancel its own output.

In addition to timestamp comparison, echo can also be detected by the speech recognizer. For example, if at TS4 the second telephone recognizer audio that it played at TS1, (and the audio files are different), this implies that second telephone is hearing itself rather than hearing the first telephone, which is also an echo and/or noise cancellation failure. In this manner, the speech recognizer's outcome helps in detecting echoes and/or noise cancellation failures, and more particularly in detecting delayed echoes that cannot be detected using the timestamp comparison.

Figure 6:
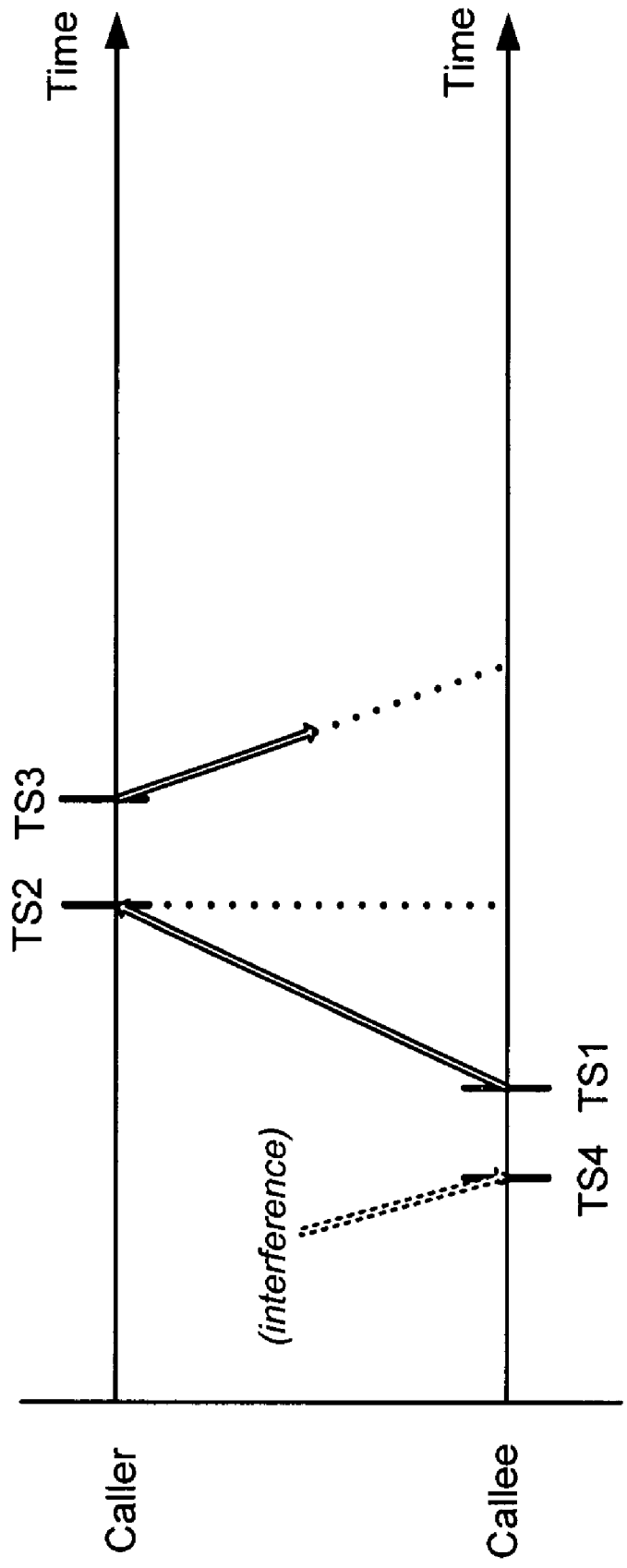
FIG. 6 is a timing diagram representing example time stamps triggered by first telephone and second telephone operations in a device under test that is generating interference detected by the second telephone.
Figure 7:
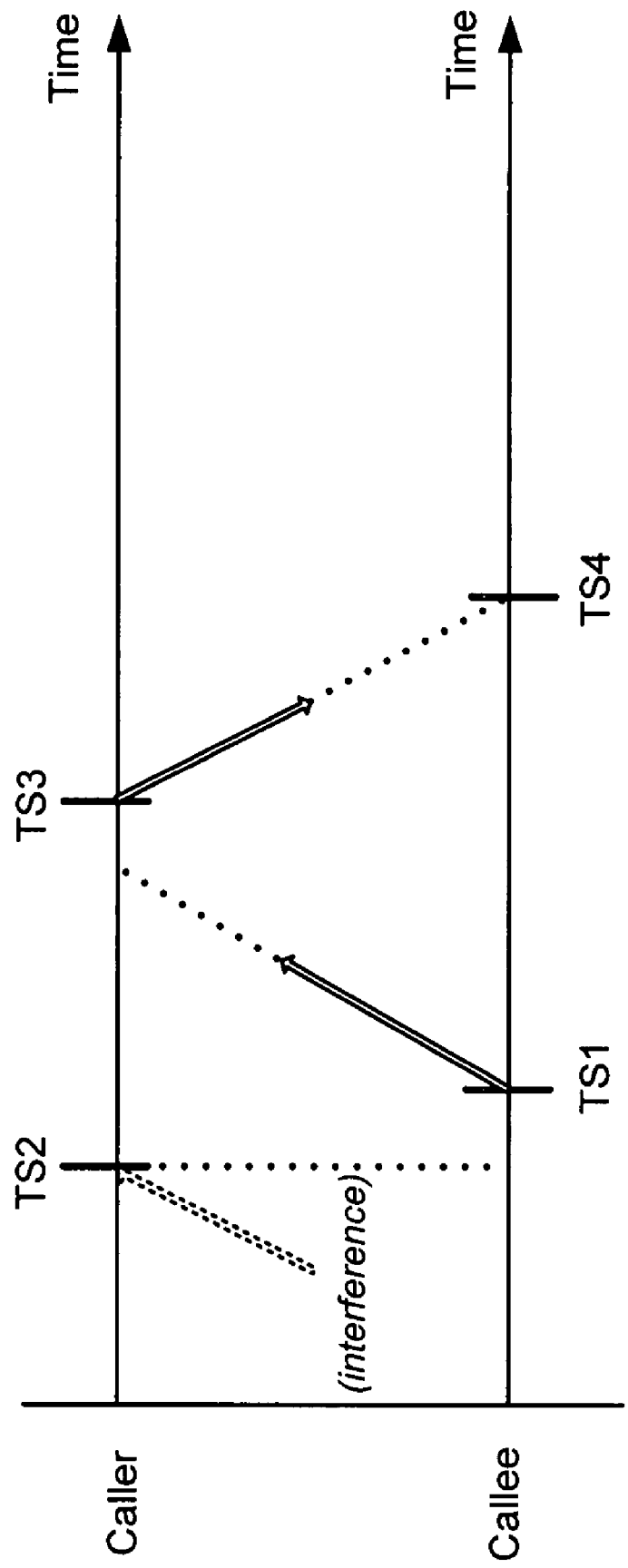
FIG. 7 is a timing diagram representing example time stamps triggered by first telephone and second telephone operations in a correctly executing device under test that is generating interference detected by the first telephone.

FIG. 6 represents interference being detected on the second telephone's side. In FIG. 6, the value of TS4 is less than that of TS1. This implies that the second telephone detects the speech even before any audio file has been played, which indicates noise interference in the audio coupling. Similarly, as represented in FIG. 7, when the value of timestamp TS2 is less than that of TS1, this situation implies that first telephone detects the speech before any audio file has been played by the second telephone, thereby indicating noise interference in the audio coupling.

As can be readily appreciated, the concept as to which telephone mechanism is the first telephone and which is the second telephone can be reversed in one or more subsequent tests, simply by having the first logic call the other telephone and vice-versa with the second logic. Thus, both telephones may be tested in an automated fashion.

In this manner, the test configurations (FIGS. 1 and 2) can quantitatively determine the quality of the audio output and input in VoIP conversations, including by using automated speech recognition. The test configurations can detect echoes and/or noise cancellation failures, random noise interferences and speech distortion introduced by the telephones and/or by any intermediary device or devices.

As can be readily appreciated, the above description is mainly for illustrative and example purposes. Those skilled in the art can easily generalize the invention to a large scale test operation, e.g., with multiple first telephones making calls to multiple second telephones, such as via multiple computing devices. Further, the various technological aspects and concepts described herein may be applied in an environment in which a mixture of PSTN, cellular and/or VoIP calls are simultaneously involved.

Exemplary Operating Environment

Figure 8:
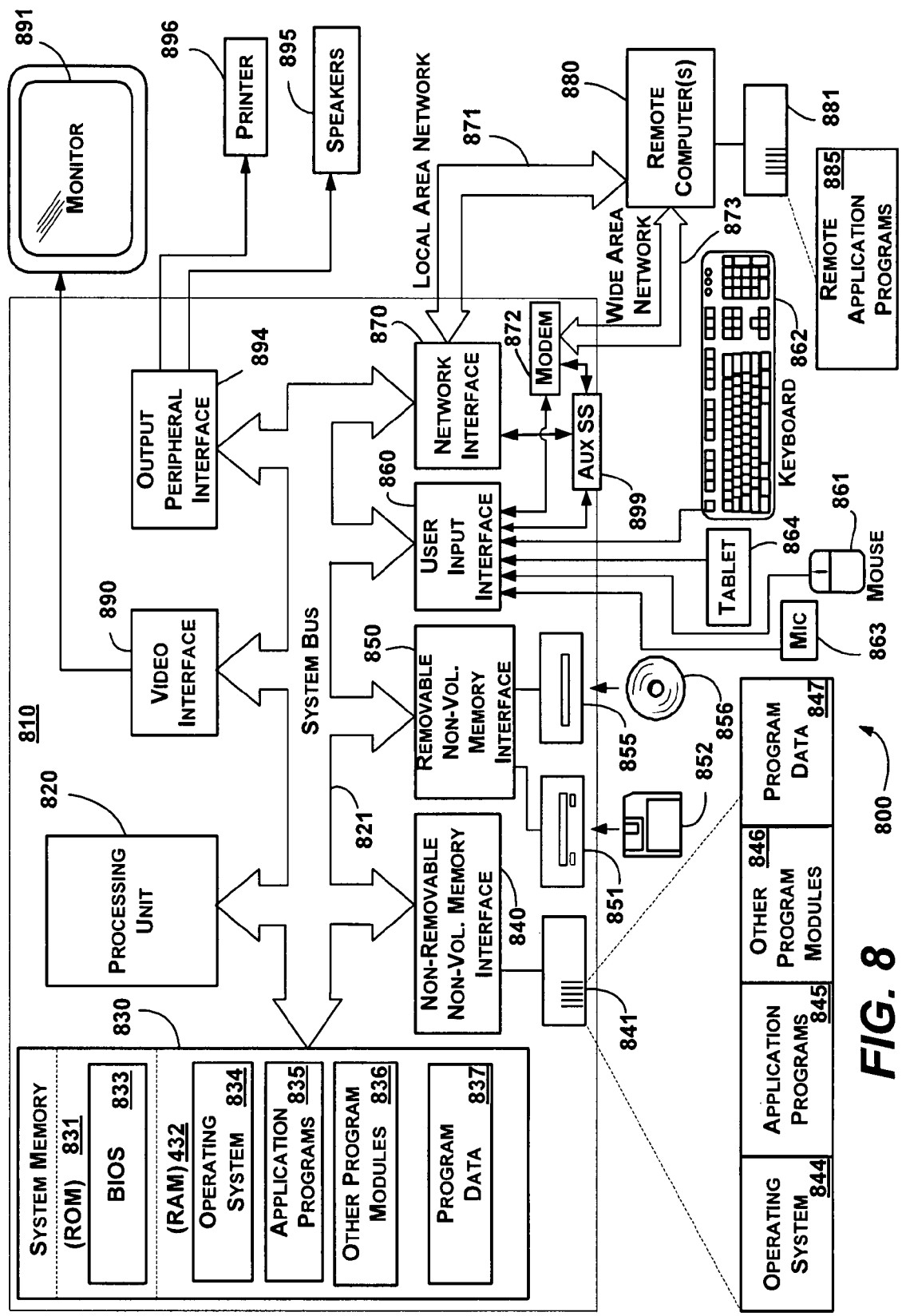
FIG. 8 shows an illustrative example of a general-purpose network computing environment into which various aspects of the present invention may be incorporated.

FIG. 8 illustrates an example of a suitable computing system environment 800 on which the computing device 102 of FIGS. 1 and 2 may be implemented. The computing system environment 800 is only one example of a suitable computing environment and is not intended to suggest any limitation as to the scope of use or functionality of the invention. Neither should the computing environment 800 be interpreted as having any dependency or requirement relating to any one or combination of components illustrated in the exemplary operating environment 800.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 8, an exemplary system for implementing various aspects of the invention may include a general purpose computing device in the form of a computer 810. Components of the computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 810 typically includes a variety of computer-readable media. Computer-readable media can be any available media that can be accessed by the computer 810 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 810. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836 and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media, described above and illustrated in FIG. 8, provide storage of computer-readable instructions, data structures, program modules and other data for the computer 810. In FIG. 8, for example, hard disk drive 841 is illustrated as storing operating system 844, application programs 845, other program modules 846 and program data 847. Note that these components can either be the same as or different from operating system 834, application programs 835, other program modules 836, and program data 837. Operating system 844, application programs 845, other program modules 846, and program data 847 are given different numbers herein to illustrate that, at a minimum, they are different copies. A user may enter commands and information into the computer 810 through input devices such as a tablet, or electronic digitizer, 864, a microphone 863, a keyboard 862 and pointing device 861, commonly referred to as mouse, trackball or touch pad. Other input devices not shown in FIG. 8 may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. The monitor 891 may also be integrated with a touch-screen panel or the like. Note that the monitor and/or touch screen panel can be physically coupled to a housing in which the computing device 810 is incorporated, such as in a tablet-type personal computer. In addition, computers such as the computing device 810 may also include other peripheral output devices such as speakers 895 and printer 896, which may be connected through an output peripheral interface 894 or the like.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include one or more local area networks (LAN) 871 and one or more wide area networks (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860 or other appropriate mechanism. A wireless networking component 874 such as comprising an interface and antenna may be coupled through a suitable device such as an access point or peer computer to a WAN or LAN. In a networked environment, program modules depicted relative to the computer 810, or portions thereof, may be stored in the remote memory storage device. By way of example, and not limitation, FIG. 8 illustrates remote application programs 885 as residing on memory device 881. It may be appreciated that the network connections shown are exemplary and other means of establishing a communications link between the computers may be used.

An auxiliary subsystem 899 (e.g., for auxiliary display of content) may be connected via the user interface 860 to allow data such as program content, system status and event notifications to be provided to the user, even if the main portions of the computer system are in a low power state. The auxiliary subsystem 899 may be connected to the modem 872 and/or network interface 870 to allow communication between these systems while the main processing unit 820 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a system comprising: a first telephone mechanism including a first telephone device having an audio coupling comprising audio input and output with a second telephone device of a second telephone mechanism, in which the first telephone device is arranged to detect sound at a microphone therein including audio output by a speaker of the second telephone device, and the second telephone device is arranged to detect sound at a microphone therein including audio output by a speaker of the first telephone device; analyzer logic that receives timestamps from the first telephone mechanism and the second telephone mechanism during a calling session, including a first timestamp corresponding to when the second telephone initially outputs audio to the first telephone, a second timestamp corresponding to when the first telephone mechanism initially detects sound, a third timestamp corresponding to when the first telephone mechanism initially outputs audio to the second telephone mechanism, and a fourth timestamp corresponding to when the second telephone mechanism initially detects sound, and wherein the analyzer logic determines that: a) the audio coupling is operating correctly with respect to not having interference or echo when the first timestamp is before the second timestamp, the second timestamp is before the third timestamp, and the third timestamp is before the fourth timestamp; b) the audio coupling has interference when the fourth timestamp is before the first timestamp, or when the second timestamp is before the first; or c) the audio coupling has echo when the fourth timestamp is before the third timestamp and after the first timestamp, or the second telephone detects its own audio at the fourth timestamp that it initially provided at the first timestamp, and wherein the results correspond to echo being detected at the second telephone mechanism.

2. The system of claim 1 wherein the audio output by the first telephone mechanism to the second telephone mechanism includes speech, wherein the second telephone mechanism is coupled to a speech recognizer that recognizes the speech and further includes logic for determining a confidence level corresponding to accuracy of speech recognition, and wherein the analyzer logic generates a report based on the confidence level and whether the audio coupling has interference or echo.

3. The system of claim 2 wherein the first telephone device and second telephone device are coupled to a computing device including logic that calls the first telephone device and second telephone device and controls the audio output of the first telephone device and second telephone device, and wherein the first and the second telephone devices automatically answer the calls from the logic included in the computing device.

4. The system of claim 2 wherein the first telephone device and second telephone device are each called via an IP-PBX device to establish the audio coupling.

5. In a computing environment, a method comprising: evaluating quality of an audio coupling comprising audio input and output between a first telephone juxtaposed with a second telephone, including: outputting at the second telephone, at a first time, first audio generated from a first audio file; detecting sound at the first telephone at a second time, and in response, at a third time, outputting from the first telephone second audio generated from a second audio file; and detecting sound at the second telephone at a fourth time; and analyzing relative timing of members of a time set containing at least two of the first, second, third or fourth times to provide results indicative of the quality of the audio coupling.

6. The method of claim 5 further comprising, calling the first telephone and the second telephone via logic of a computing device to establish the audio coupling.

7. The method of claim 5 further comprising, calling the first telephone and the second telephone via an IP-PBX device to establish the audio coupling.

8. The method of claim 5 wherein outputting at the second telephone first audio comprises playing speech to a speech recognizer associated with the first telephone.

9. The method of claim 5 wherein outputting at the first telephone the second audio comprises playing speech to a speech recognizer associated with the second telephone, and wherein evaluating the quality further comprises analyzing a confidence level corresponding to speech recognition accuracy of speech detected at the second telephone.

10. The method of claim 9 further comprising, determining the confidence level at the second telephone based on actual recognition versus expected recognition of the speech detected at the second telephone.

11. The method of claim 5 wherein analyzing the relative timing comprises determining that the first time is before the second time, the second time is before the third time, and the third time is before the fourth time, and wherein the results correspond to correct operation of the audio coupling with respect to not having interference, echo or improper noise cancellation, or any combination of interference, echo or improper noise cancellation.

12. The method of claim 5 wherein analyzing the relative timing comprises determining that the fourth time is before the first time, or determining that the second time is before the first time, and wherein the results correspond to interference in the audio coupling being detected at the second telephone.

13. The method of claim 5 wherein analyzing the relative timing comprises determining that the fourth time is before the third time and after the first time, or the second telephone detects its own first audio, and wherein the results correspond to echo in the audio coupling being detected at the second telephone.

14. The method of claim 5 further comprising, receiving at the analyzer first and fourth timestamps from logic associated with the second telephone, the first and fourth timestamps corresponding to the first and fourth times, respectively, and receiving at the analyzer second and third timestamps from logic associated with the first telephone, the second and third timestamps corresponding to the second and third times, respectively.

15. A computer-readable storage medium having computer-executable instructions stored thereon that, in response to execution by a computer, cause the computer to perform a method comprising, performing at least one test to analyze quality of an audio coupling established between a first telephone and a second telephone, each test including establishing a first timestamp corresponding to when the second telephone outputs first audio to the first telephone, establishing a second timestamp corresponding to when the first telephone detects sound, establishing a third timestamp corresponding to when the first telephone outputs second audio to the second telephone, establishing a fourth timestamp corresponding to when the second telephone detects sound, and using at least some of the timestamps to determine whether the audio coupling has interference or echo.

16. The computer-readable storage medium of claim 15 wherein using at least some of the timestamps to determine whether the audio coupling has interference or echo comprises determining that the audio coupling has interference when the fourth timestamp is before the first timestamp or the second timestamp is before the first timestamp, or determining that the audio coupling has echo when the fourth timestamp is before the third timestamp and after the first timestamp, or the speech recognizer on the second telephone mechanism detects its own audio at the third timestamp that it played at the first timestamp.

17. The computer-readable storage medium of claim 15 having further computer-executable instructions stored thereon that, in response to execution by the computer cause the computer to perform the method further comprising, performing a plurality of tests, including one test set in which one digital telephone corresponds to the first telephone and another digital telephone corresponds to the second telephone, and wherein the digital telephones are reversed for another test set such that in the other test set, the one digital telephone corresponds to the second telephone and the other digital telephone corresponds to the first telephone.

18. The computer-readable storage medium of claim 15 wherein at least one of the first or second audio comprises speech, and wherein analyzing the quality of the audio coupling further comprises evaluating the accuracy of recognition of the speech.

19. The computer-readable storage medium of claim 18, wherein evaluating the accuracy of the recognition of the speech comprises evaluating actual recognition versus expected recognition of the speech.

20. The computer-readable storage medium of claim 15, having further computer-executable instructions stored thereon that, in response to execution by the computer cause the computer to perform the method further comprising, selecting a random audio file for the first audio or for the second audio, or selecting different random audio files for the first audio and for the second audio, or selecting a random interval corresponding to when the first telephone outputs second audio to the second telephone, or any combination thereof.

* * * * *